United States Patent [19]

Perper

[11] 4,088,379

[45] May 9, 1978

[54] VARIABLE PERMANENT MAGNET SUSPENSION SYSTEM

[76] Inventor: Lloyd J. Perper, 3725 Ironwood Dr., Tucson, Ariz. 85705

[21] Appl. No.: 709,559

[22] Filed: Jul. 28, 1976

Related U.S. Application Data

[63] Continuation-in-part of Ser. No. 507,108, Sep. 18, 1974, abandoned.

[51] Int. Cl.² .............................................. F16C 39/00
[52] U.S. Cl. .................................................... 308/10
[58] Field of Search ........................ 308/10; 310/166; 324/151, 154; 74/5, 5.4, 5.6, 5.9; 73/472, 473

[56] References Cited

U.S. PATENT DOCUMENTS

| | | | |
|---|---|---|---|
| 3,490,816 | 1/1970 | Lyman | 308/10 |
| 3,493,275 | 2/1970 | Stone | 308/10 |
| 3,614,181 | 10/1971 | Meeks | 308/10 |
| 3,650,581 | 3/1972 | Boden | 308/10 |
| 3,791,704 | 2/1974 | Perper | 308/10 |
| 3,811,740 | 10/1969 | Lyman | 308/10 |
| 3,860,300 | 1/1975 | Lyman | 308/10 |

*Primary Examiner*—R. Skudy

*Attorney, Agent, or Firm*—Allen V. Hazeltine; Thomas M. Ferrill, Jr.

[57] ABSTRACT

A magnetic suspension system employing magnetic force-applying means associated with a movable object, in which electrical signals which are a function of at least the rate of change of displacement of said object are applied to said force appliers to restore the object to a reference position whenever it is displaced therefrom by external forces, and in which electrical signals are also applied to said force appliers to produce permanent magnetization therein sufficient to maintain said object in its stable equilibrium position without the application of appreciable power in the absence of further external forces tending to displace it therefrom. The force appliers may comprise loops of magnetically permeable material including as a part thereof a substantially cylindrical portion adapted to encircle a movable object and having a pole piece positioned to exert magnetic force on said object, said loop also being provided with first and second sections of permanently magnetizable material in separate arms thereof, and first and second magnetizing windings respectively encircling said separate arms.

23 Claims, 4 Drawing Figures

VARIABLE PERMANENT MAGNET SUSPENSION SYSTEM

This application is a continuation-in-part of my copending application Ser. No. 507,108, now abandoned, filed Sept. 18, 1974 for Variable Permanent Magnet Suspension System.

This invention relates to magnetic suspension systems. More particularly it relates to means for suspending an object in space using magnetic force producing means for producing a superposed combination of magnetic fluxes produced by electromagnets and permanent magnet means, in which virtually zero power is required to maintain the suspension of the object once an equilibrium condition has been reached with respect to external forces acting on the object.

In U.S. Pat. No. 3,860,300 of Joseph Lyman, granted January 14, 1975 for Virtually Zero Powered Magnetic Suspension, is disclosed such a system employing a combination of permanent magnets and electromagnets in which the actuation of the electromagnets is controlled in response to at least the rate of change of displacement of a movable object, along with displacement signals if desired, to cause the object to move into such a position with respect to the permanent magnets that the force exerted by the permanent magnets thereon is capable of maintaining the object in a stable equilibrium condition in the absence of additional forces tending to displace in therefrom, and in which when this equilibrium condition is reached, virtually zero power is required to maintain the object in that condition. In that system reliance is placed on exerting forces to displace the movable object to a position in which one of its extremities is closer to one of two force-producing permanent magnets, whereby there is produced a net force upon the object sufficient to overcome and balance the external forces, such as gravity, acting on the object and to maintain the object in an equilibrium condition in the absence of further external forces tending to displace it therefrom.

While the system disclosed by Lyman is completely workable and highly desirable in that it provides a magnetic suspension system requiring virtually zero power to maintain an object in suspension once the equilibrium condition has been established, it is subject to the disadvantage that, in the equilibrium condition, the object is displaced unequally from the permanent magnet force-exerting means, which may be incompatible with the axial positioning requirements of devices such as gyroscopes.

In my U.S. Pat. No. 3,791,704, granted Feb. 12, 1974 for Trimming Apparatus For Magnetic Suspension Systems, is disclosed a suspension system in which permanent magnets are caused to be moved in position or modified in strength so as to maintain virtually zero power at an unchanging reference position of the suspended object. In the present invention, alternative means are provided for maintaining virtually zero power at an unchanging gap displacement, wherein electromagnets and permanent magnets are used in interrelated magnetic circuitry.

Accordingly it is an object of the invention to provide an improved magnetic suspension system employing permanent magnet and electromagnetic force-exerting means in which, when a movable object is supported in stable reference position with respect to two cooperating permanent magnet forceexerting means, it is symmetrically positioned with respect thereto. Further it is an object of the invention to provide such a system in which, when the movable object has been positioned in its stable reference position, virtually zero power is required to maintain it in that position in the absence of further external forces tending to displace it therefrom.

In accordance with the invention these objectives are achieved by providing at least one magnetic force-applying means associated with a movable object, means for applying to said force-applying means servo signals which are a function of at least the rate of change of displacement of said object, and which preferably may also be a function of displacement thereof, in a manner to produce a magnetic force tending to overcome said displacement and restore said object to a reference position, and additional means for applying to said force-applying means high-intensity current pulses varying according to the time-integral of said servo signals to alter the permanent magnetization of a permanent magnet included in said force applying means to produce a net magnetic force such as to maintain said object in a stable reference position with the application of a minimum of electric power through said servo signal applying means.

The permanent magnet sections included in the magnetic loop comprise materials of two different types. One may comprise a rare earthcobalt magnetic material such as samarium cobalt, which is essentially free of hysteresis, and the second may comprise a material such as Alnico V whose permanent magnetization may be altered by exposure to an intense magnetic field. The cylindrical portion of the magnetic loop encircling the movable object is constructed so as to provide a large-area, low-reluctance gap between it and the supported object so as to produce little force on the object, the principal force thereon being exerted longitudinally of its axis by the pole pieces in the magnetic loop positioned near the end of the object.

In operation of the system, servo signals indicative of displacement and rate of displacement of the movable object are applied to the first and second windings of both magnetic loops to produce fluxes therein such as to produce additive fluxes through said pole pieces and said movable object tending to restore the movable object to a stable reference position along its longitudinal axis. The servo signals also are integrated to produce signals varying according to the time-integral thereof, and the integrated signals are used to control the application of high-intensity current pulses to said first and second windings in a manner to produce circulating magnetic fluxes in said magnetic loops such as to alter the permanent magnetization of said permanently magnetizable material whose permanent magnetization can be altered to an extent such as to enable it to maintain said movable object in said reference position in the absence of further forces tending to displace it therefrom with the application of minimum power to the system.

Further in accordance with the invention there are provided means for sensing axial displacement of the suspended object, stable loop-filtering means for processing the signals indicative of axial displacement, means for providing servo control of axial position of the object so as to maintain fixed gap displacement, and means for adjusting the variable permanent magnet flux component in the support gap so as to minimize suspension power. Since, in the arrangement according to the invention, passive stable lateral support is provided by fringing fluxes at the gap, a biased axial flux is required which never goes to zero. However it should be understood that the invention is not restricted to use with embodiments employing axial gaps, but may be used with arrangements employing radial gaps.

Further features of the invention are as follows:

(1) To combine electromagnet and permanent magnet flux in a common magnetic support gap so as to utilize the square-law force/flux relationship and the wide range of force variation resulting therefrom.

(2) To provide magnetic circuitry employing both invariant and variable permanent magnets in such a way that the hysteresis state of the latter may be changed without removal from the circuitry.

(3) To provide two or more magnetizing coils which, for dynamic support purposes, may be fed so that their fluxes add in the support gap.

(4) To provide for subtractive drive of the magnetizing coils so that flux increments which change the state of the variable permanent magnets tend to cancel in the support gap.

(5) To utilize short magnetic impulses to change the state of the variable permanent magnet material with the capability of adapting the generation of such impulses to minimize energy consumption and optimize convergence time.

(6) To provide a system having a geometry in which the supported member may be a simple cylinder with support gaps at its end faces and with low reluctance flux return gaps to outer concentric cylindrical pole pieces.

(7) To provide self-shielded axial sensing means using a magnetic sensor such as a Hall-effect probe inserted axially in the interior of the supported cylinder and cooperating with a permanent magnet therein.

(8) To provide a wide, linear range of displacement sensing by using a Hall-effect probe as a multiplier whose output is fed to an amplifier as input thereto, the output of the amplifier comprising the d-c input to the Hall probe.

(9) To provide quasi-integral feedback in the suspension loop filter as an alternative to displacement-plus-rate feedforward, so as to control noise and overload effects.

(10) Preferably, along with the foregoing, to provide a permanent magnet flux bias at the support gaps so as to assure stable passive radial support.

The invention will be fully understood from consideration of the following detailed description thereof with reference to the accompanying drawings in which.

Figure 1:
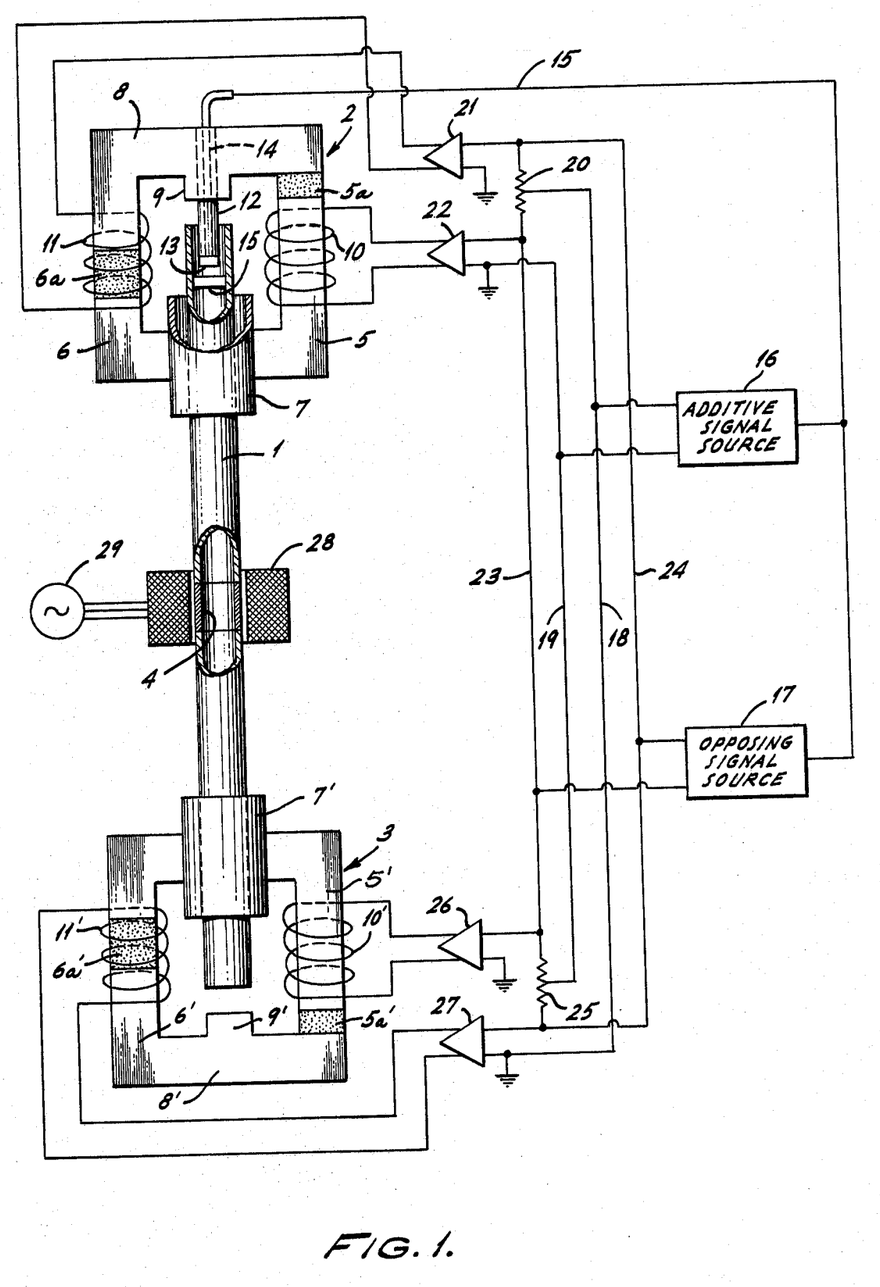
FIG. 1 is a generalized showing, partially schematic and partially in section, of a preferred embodiment of the invention, FIGS. 2A and 2B respectively are elevation and plan views, partially in section, showing details of a magnetic force-applier suitable for use in the embodiment of FIG. 1.

Referring to FIG. 1, a rigid body 1 of ferromagnetic material, which may comprise a piece of iron pipe, is suspended between magnetic force appliers 2 and 3 disposed at opposite ends of said rigid body. Preferably, for reasons which will be explained hereinafter, said rigid body 1 includes an intermediate portion 4 of non-magnetic material for magnetically isolating the opposite ends thereof one from the other for reasons which will be explained later. This intermediate portion may consist of a non-magnetic material such as brass suitably joined to the ferromagnetic portions forming the opposite end portions thereof.

The magnetic force applying means 2 and 3 are identical in structure, each comprising a closed loop of magnetically permeable material consisting of side portions or arms 5, 5', 6 and 6', substantially cylindrical portion 7 and 7' each adapted to encircle said rigid object near one end thereof and disposed in proximity thereto, and pole pieces 9 and 9' each disposed proximate one end of said object.

Each of the arms 5, 5', 6 and 6' of the magnetic loops 2 and 3 include in series therewith a section of permanently magnetizable material, 5a, 5a', 6a and 6a', the sections 6a and 6a' included in one side of each loop consisting of magnetic material such as Alnico V having variable hysteresis characteristics, and those 5a and 5a' included in the other side of said loop consisting of (preferably) a rare earth cobalt magnetic material such as samarium cobalt having invariant hysteresis characteristics. Because the permeability of Alnico V is about 5 times as great as that of samarium cobalt, it will be desirable to use a section of samarium cobalt approximately one-fifth the length of the section of Alnico V in order to balance the permeability in the two arms of the magnetic loop. In addition to samarium cobalt other materials such as platinum cobalt can be used. Suitable magnetic materials may be designated more generally as R Co, where R includes not only 15 elements of atomic numbers 57 (lanthanum) through 71 (lutetium), but also their close chemical kin such as yttrium (atomic number 39) and scandium (atomic number 21). In addition, Sm $Co_{5-x} Cu_x$ (where $x = 1$ to 4), as well as other ternary compositions, can be employed, including: Co Sm Pr; Co Cu Ce; Co La Sm and the like. In some instances mischmetal, the cerium rich rare earth alloy having the nominal composition 50 wt. % Ce, 27 wt. % La, 16 wt. % Nd, 5 wt. % Pr and 2 wt. % other rare earth metals, may be substituted for Sm in order to reduce costs.

Magnetizing windings 10, 10', 11 and 11' are provided encircling each of arms 5, 5', 6 and 6' of magnetic loops 2 and 3. Extending from pole piece 9 of magnetic loop 2 into one end of object 1 is a probe 12 having affixed to the end thereof a Hall effect or other suitable sensing device 13 which cooperates with a permanent magnet 15 affixed within object 1 in proximity thereto and which cooperates therewith to develop signals indicative of displacement of object 1 along its longitudinal axis. Such signals developed in sensor 13 are supplied through leads 14 to an output lead 15 connected to the inputs of an additive signal source 16 and an opposing signal source 17. Additive signal source 16 comprises circuitry constructed and arranged to develop in response to the input signals thereto electrical servo signals which are applied through connections 18 and 19 and bridge circuits, comprising respectively resistor 20 and amplifiers 21 and 22 and resistor 25 and amplifiers 26 and 27, to windings 10, 10', 11 and 11' which are such as to produce in magnetic loops 2 and 3 fluxes such as to produce additive fluxes through the gap between pole pieces 9 and 9' and the ends of movable object 1, returning through the gap between movable object 1 and cylindrical portions 7 and 7' of magnetic loops 2 and 3, which preferably are disposed close to the sides of movable object 1 so as to provide low reluctance return paths for such flux. The servo signals supplied to coils 10, 10', 11 and 11' from additive signal source 16 are so proportioned in magnitude by the circuitry of said source as to tend to restore movable object 1 to its original position whenever it has been caused to depart therefrom in response to external forces, such as gravity, acting thereon. By the inclusion of the non-magnetic section 4 intermediate the ends of body 1 the magnetizing effects of force appliers 2 and 3 are prevented from interacting with each other.

Opposing signal source 17 comprises circuitry constructed and arranged to develop, in response to the input signals supplied thereto, high-intensity current pulses controlled in accordance with the time-integral of said input signals which are supplied through connections 23 and 24 and the aforementioned bridge circuits 20, 21, 22 and 25, 26, 27 to windings 10, 10', 11 and 11' which are such as to produce in said windings currents tending to produce circulating fluxes in magnetic loops 2 and 3 which tend to flow primarily in the loop itself and not through the gaps between pole pieces 9 and 9' and the opposing ends of movable object 1. The currents flowing in windings 10, 10', 11 and 11' are so controlled by the action of the circuitry of opposing signal source 17, as to cause the permanent magnet sections 6a and 6a' which have the hysteresis (variable) characteristic in each of loops 2 and 3 to have imparted to them permanent magnetizations sufficient to maintain the movable object in a statically stable but dynamically unstable equilibrium condition in the absence of signals applied to windings 10, 10', 11 and 11' and in the absence of further forces tending to displace it from that position.

Also provided in the arrangement of FIG. 1 is a motor field unit 28 encircling object 1 which is energized by a suitable alternating current source, e.g. a polyphase source 29, for imparting high speed rotation to object 1.

The operation of the system above described may be summarized as follows:

1. When the suspended object 1 moves downward from its neutral position, signals indicative of such downward displacement are developed in sensor 13 and supplied through connection 15 to additive signal source 16, which in response to said signals develops signals representative of rate of displacement as well as displacement.

2. Servo signals from the output of additive signal source 16 are supplied to coils 10 and 11 to produce magnetic flux in the axial gap between pole piece 9 and the upper end of object 1 which adds to the gap flux produced by the samarium cobalt magnet 5a so as to increase the net force exerted on object 1 in an upward direction.

3. Similarly, in the embodiment described employing two symmetrically disposed magnetic force appliers 2 and 3 respectively arranged on opposite sides of the central portion of object 1, servo signals are supplied from the output of additive signal source 16 to coils 10' and 11' which produce magnetic flux in the gap between pole piece 9' of the lower magnetic force applier 3 and the lower end of object 1 which tends to oppose the gap flux produced by samarium cobalt magnet 5a' so as to reduce the net downward force exerted on object 1 by the lower magnetic force applier 4. The servo currents in coils 10, 11, 10' and 11' increase with increasing downward displacement of object 1 until downward movement of object 1 has been overcome, at which time the power applied by the servo systems to coils 10, 11, 10' and 11' will be relatively large.

5. As a function of the increasing time-integral of the servo signal developed in opposing signal source 17, that source will develop high-intensity current pulses which are applied through coils 10 and 11 in the direction to circulate the flux around the magnetic loop in the direction opposite to that produced by samarium cobalt magnet 5a. This will produce a change in the permanent magnetization of Alnico magnet 6a such as to cause it to provide a flux in the gap between pole piece 9 and object 1 which adds to the flux produced by magnet 5a.

6. In the lower unit 3, current pulses are applied to coils 10' and 11', also sensed to produce flux around the magnetic loop but in such a sense as to alter the permanent magnetization of magnet 6a' to cause it to produce a flux opposing that due to magnet 5a', or to reduce its aiding effect if that effect were initially aiding, so as to reduce the net downward force applied by the lower force applier.

7. The net result of the actions described above is an increase in the net upward force applied to object 1 by virtue of the permanent magnets 5a and 6a in the upper force applier 2, and a reduction in the net downward force exerted on object 1 by the lower force applier 3 by virtue of permanent magnets 5a' and 6a'. The changing of the magnetization of the Alnico magnets 6a and 6a' continues until the net force exerted on object 1 by the upper and lower force appliers has become just sufficient to oppose a persisting external force, such as gravity, operating on object 1. When this point has been reached, the servo action in the system will contribute only a stabilizing effect rather than a continuing unilateral application of supporting force requiring the continued supply of substantial amounts of electric power and the attendant problems such as heating resulting therefrom.

Figure 2A:
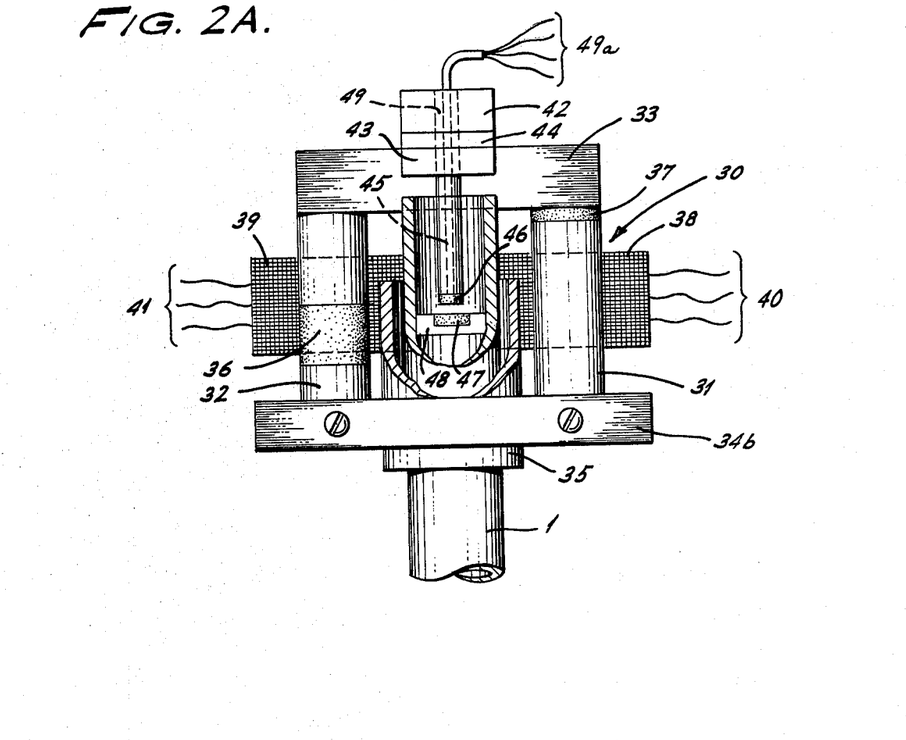
Figure 2B:
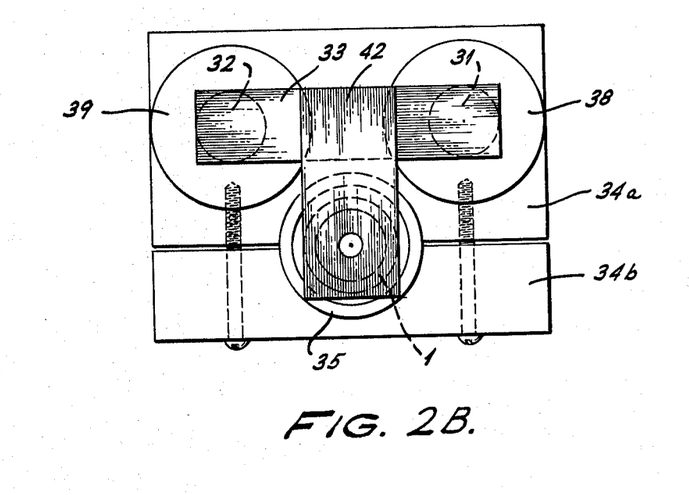

Referring now to FIGS. 2A and 2B, there are shown detailed elevation and plan views of a magnetic force applier 30 suitable for use as the force appliers 2 and 3 in the embodiment of FIG. 1. The force applier 30 comprises separate arms 31 and 32 of suitable ferromagnetic material, having included therein sections 36 and 37 of permanently magnetizable material, one of which 36 is a material having variable hysteresis characteristics such as Alnico V and the other of which 37 may be a material having invariant (single-line B-H curve) characteristics such as samarium cobalt. The upper ends of the arms 31 and 32 are interconnected by a yoke of ferromagnetic material 33, and the lower ends thereof are interconnected by a yoke of ferromagnetic material 34 which may be formed in two pieces 34a and 34b to receive a hollow cylindrical portion 35 of ferromagnetic material encircling object 1. The latter may be a piece of iron pipe of slightly larger diameter than the pipe forming object 1 and such as to provide a relatively small, large-area air gap between its inner surface and the outer surface of object 1 to provide a low reluctance return path for the magnetic structure. Arms 31 and 32 are provided with magnetizing coils 38 and 39 respectively encircling them, the magnetizing coils being center-tapped and provided with separate output leads 40 and 41. Affixed to the top of yoke portion 33 is an extension 42 of ferromagnetic material having a pole piece 43 extending toward the end of object 1. Preferably included in portion 42 is a section 44 of permanent magnet material for providing a biasing force exerted on object 1 to increase the steady bias flux at the gap between pole piece 43 and the end of object 1, on which radial restoring force depends. Extending from pole piece 43 into the end of object 1 is a probe 45 having a Hall-effect or other suitable sensing device 46 affixed to the end thereof for cooperation with a permanent magnet 47 suitably supported in object 1 by a support 48. Electrical connection is made to sensor 46 through a cable 49 comprising a plurality of conductors 49a for connection to circuitry for utilizing signals generated by the sensor 46 in response to displacement of object 1, as will be explained hereinafter.

Figure 3:
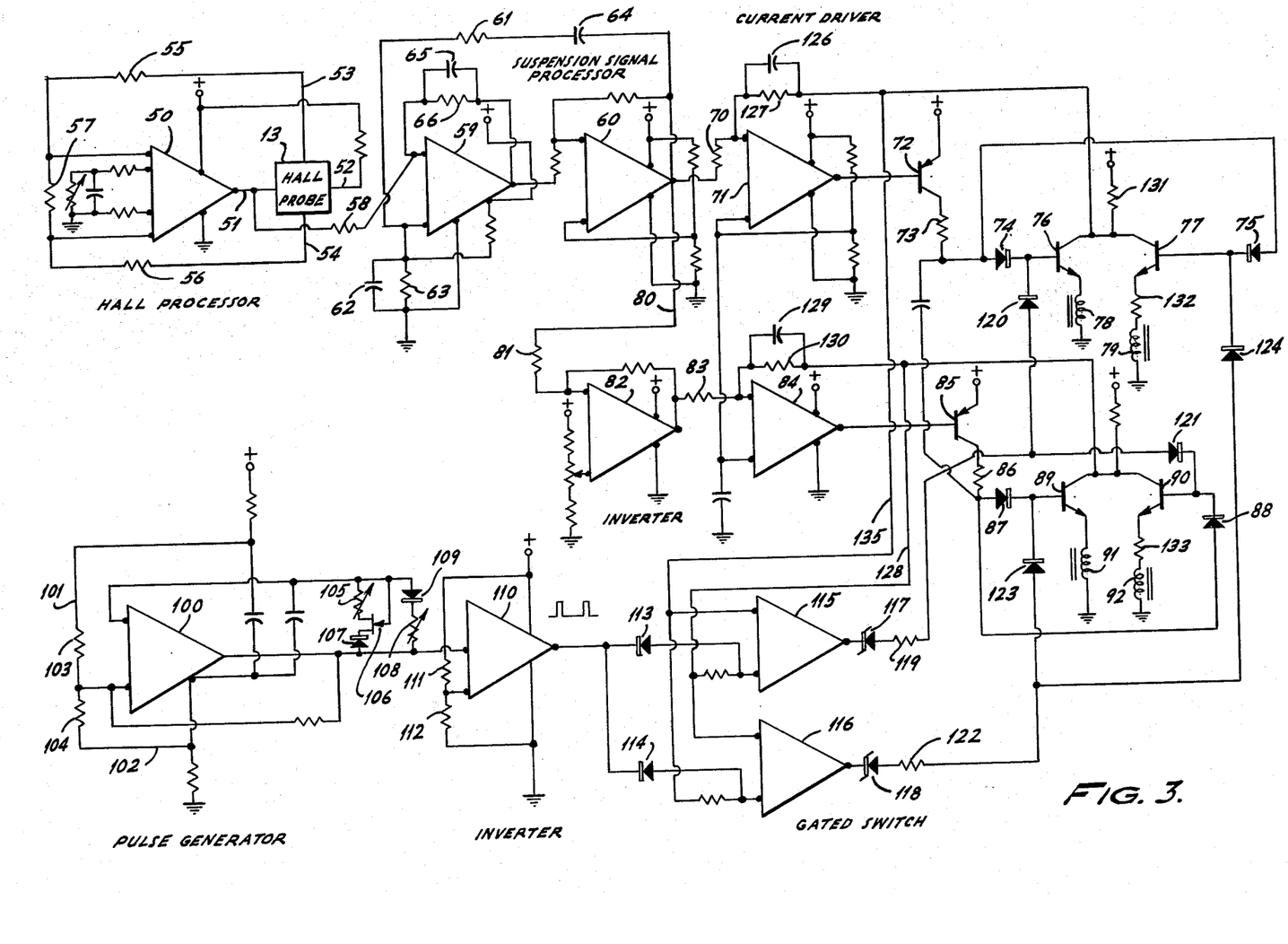
FIG. 3 is a schematic diagram showing in detail suitable circuitry for use in the embodiment of the invention according to FIG. 1.

Referring to FIG. 3, there is shown detailed circuitry suitable for use in developing, in response to the signals derived from Hall-effect sensor 13 in the embodiment of FIG. 1, electrical signals for application to magnetizing windings 10, 10', 11 and 11' in that embodiment to effect and maintain the desired positioning of the object 1. In FIG. 3 the Hall-effect sensor 13 is connected in a circuit including an amplifier 50 with leads 51 and 52 connected to outputs of the amplifier and leads 53 and 54 connected to the input thereof through resistors 55 and 56 respectively and resistor 57 to provide a closed loop. The product of the amplifier output and the magnetic flux at the Hall-effect sensor (comprising the Hall-effect outputs at 53, 54) is fed back to the input of amplifier 50. This causes the output of the amplifier at lead 51 to vary as the reciprocal of the flux density measured by the Halleffect sensor. Since the measured flux density varies approximately as the reciprocal of the length of the gap between pole piece 9 and the end of object 1 in the embodiment of FIG. 1, the output of the circuit at lead 51 will be approximately a linear function of gap length over a substantial range. This output is supplied through resistor 58 to the input of an amplifier 59 which, together with amplifier 60 connected in cascade therewith, forms a signal processing circuit for processing the output of amplifier 50, which is indicative of the displacement of object 1, to yield signals at the output of amplifier 60 which are representative not only of displacement but also of the rate of change of displacement of object 1. This result is accomplished by means of a quasi-integral feedback from amplifier 60 to amplifier 59 through resistor 61. The effect of such feedback is to cause the suspended object, in the absence of further forces applied thereto by the variable permanent magnet means in accordance with the invention, to assume a position such as to reduce the amount of power required to support it. Also if desired a capacitor 64 of approximately 0.1 microfarad may be included in series with feedback resistor 61 to assist in reducing the power utilized by the system of FIG. 1 to virtually zero when object 1 is in its normal stable equilibrium condition.

The output signals from amplifier 60 are supplied through resistor 70 to the input of an amplifier 71 whose output is in turn connected to the base of a driver transistor 72 whose collector is connected through resistor 73 and diodes 74 and 75 respectively to the bases of driver transistors 76 and 77. The emitter of transistor 76 is connected to ground through one half (78) of the magnetizing winding 39 of the magnetic force applier 30 of FIG. 2. Transistor 77 has its emitter connected to ground through one half (79) of the magnetizing winding 38 of the force applier. Diodes 74 and 75 function to raise the current in coils 78 and 79 in the aiding mode while permitting the supply of current through diodes 120 and 121 in the opposing mode.

The output of amplifier 60 also is supplied through connection 80 including resistor 81 to the input of inverter stage 82, the output from which is in turn supplied through resistor 83 to the input of amplifier 84 whose output is connected to the base of driver transistor 85. The collector of transistor 85 is connected through resistor 86 and diodes 87 and 88 respectively to the bases of driver transistors 89 and 90. Transistor 89 has its emitter connected to ground through the other half (91) of magnetizing winding 39 of magnetic force applier 30 of FIG. 2A, and transistor 90 has its emitter connected to ground through the other half (92) of magnetizing winding 38 of force applier 30 of FIG. 2A.

Current feedback is provided from the collectors of driver transistors 76 and 77 to the input of amplifier 71, and from the collectors of driver transistors 89 and 90 to the input of amplifier 84 through resistors 127 and 130 to improve dynamic frequency response. Capacitors 126 and 129 are provided respectively in parallel with resistors 127 and 130 to attenuate higher frequencies and reduce oscillatory tendencies in the circuit.

The circuitry just described, comprising amplifier 71, inverter stage 82, amplifier 84, transistors 72, 85, 76, 77, 89 and 90 and diodes 74, 75, 87 and 88 operates to supply to magnetizing windings 38 and 39 (FIG. 2A) signals for producing in the magnetic circuit of the force applier aiding fluxes which tend to flow primarily through the gap between pole piece 43 and one end of object 1 to produce a force on object 1 tending to restore it to a stable reference position when it is displaced therefrom. While the circuit as described shows only means for applying signals to the magnetizing windings 38 and 39 of a single force applier according to FIG. 2A, it will be understood that similar circuitry may be provided for applying signals to the magnetizing windings of a similar force applier disposed at the other end of object 1 to work in cooperation with the first force applier to maintain object 1 in its normal stable equilibrium condition and to restore it thereto when it is displaced therefrom. Such circuitry will differ from that shown in the diagram of FIG. 3 only in that the connections to the magnetizing windings of the second force applier should be reversed so as to cause it to apply to object 1 a force operating in a direction opposite to that of the first force applier so as to cooperate therewith in restoring object 1 to its stable reference condition. In providing such circuitry only partial duplication of the circuitry just described will be required since many components may perform the same function for both purposes.

Also shown in FIG. 3 is a pulse generator comprising amplifier 100 and suitable feedback connections 101 and 102 including resistors 103 and 104 for generating pulses which may be of the order of 0.05 second long and recurrent at one second intervals. This circuit may be substantially as described in "Handbook Of Operational Amplifier Applications", published by Burr Brown Research Corp., first edition, 1963, page 66. It may include a pulse interval control comprising variable resistor 105, which controls the rise time of the operational amplifier's sweep-circuit type voltage generator, as linearized by JFET 106. Variable resistor 108 and diode 109 cooperate to control the pulse length (flyback time). The output of pulse generator 100 is supplied to the input of an inverting comparator 110. The output of inverter 110 through diodes 113 and 114 gates the positive inputs of comparators 115 and 116 low (off condition) between pulses, causing the outputs to go low, thereby holding the anodes of diodes 120, 121, 123 and 124 low, making them nonconductive, and allowing normal operation of the bases of output transistors 76, 77, 89 and 90, through diodes 74, 75, 87, and 88.

During the pulse times, the positive inputs of comparators 115 and 116 are gated high, and their outputs are high or low depending on whether there is current flowing in transistors 76, 77 or 89, 90. In the former case, the voltage on lead 135 is reduced (through collector voltage dropping resistor 131), and in the latter case the voltage on lead 128 is reduced, causing the output of either comparator 115 or comparator 116 to go high. The high outputs are dropped by zener diodes 117 and 118 sufficiently to prevent the residual voltage outputs from the comparators from actuating the drive transistors 76, 77, 89, and 90.

By operation of the circuitry above described, the magnetizing windings 38 and 39 of the magnetic force applier 30 of FIG. 2A are driven in opposite polarities so as to produce circulating fluxes in the magnetic circuit of the force applier, as a result of which the resultant flux produced thereby tends to flow primarily in the magnetic circuit comprising the side portions 31 and 32 and upper and lower yoke portions 33 and 34 and not through the gap between pole piece 43 and the end of object 1. Therefore this resultant flux operates to alter the magnetization of the permanent magnet sections 36 and 37 without substantially affecting the force applied to object 1.

In operation, if the forces acting on object 1 are not balanced by the permanent magnetization produced in force appliers 2 and 3, current will flow in either transistors 76 and 77 or transistors 89 and 90, causing impulses to be applied subtractively to magnetizing windings 38 and 39. In the circuitry as shown, the pulses are so adjusted in amplitude and duration that their effects are incremental in producing changes in magnetic flux, to produce changes in permanent magnetization in the force applier, several pulses being required to change from maximum to minimum, and vice versa. The pulses persist in one channel monotonically so long as force unbalance in one direction occurs, then appear in the other channel if overshoot occurs, and may be made to vanish when the unbalance current disappears if the comparator sensitivities and voltage levels are such as to permit an output null-zone over an input voltage range.

Resistors 132 and 133 in series with coils 79 and 92 are provided to balance out differential gap flux when coils 78 and 91 and coils 79 and 92 are fed differentially to change the permanent magnetization in the force applier.

While the circuitry as described shows only means for applying signals to the magnetizing windings 38 and 39 of a single force applier according to FIG. 2A for altering the magnetization of permanent magnet section 36, it will be understood that similar circuitry may be provided for applying signals to the magnetizing windings of a similar force applier disposed at the other end of object 1 to alter the magnetization of its permanent magnet sections in a manner to cause the second force applier to cooperate with the first force applier to maintain object 1 in its normally stable equilibrium position. Such circuitry will differ from that shown in the diagram of FIG. 3 only in that the connections to the magnetizing windings of the second force applier should be reversed so as to produce in its permanent magnet sections an alteration in magnetization opposite to that of the first force applier. Obviously, in providing such circuitry only a partial duplication of the circuitry of FIG. 3 will be required since many of the components of the circuitry of FIG. 3, including the sensor 13, may perform the same function for both purposes.

By virtue of the construction of the magnetic force applier 30 of FIGS. 2A and 2B and the inclusion in arms 31 and 32 thereof of both a section of permanent magnet material 37 having invariant characteristics and another section of permanent magnet material 36 having hysteresis (variable) characteristics, it is made possible to achieve a residual magnetization of the latter, in the absence of signals applied to the magnetizing windings, such as to cause the magnetic force appliers to apply forces to opposite ends of object 1 of the appropriate magnitude to maintain object 1 in a statically stable equilibrium position in the absence of further external forces tending to displace it therefrom. More particularly, by driving windings 38 and 39 in opposition it is possible to achieve substantial changes in the magnetization of the permanent magnet section 36 in the magnetic loop of the force applier of FIG. 2A while minimizing changes in flux through the gap between pole piece 43 and the end of object 1. When the equilibrium condition is achieved, no signals will be applied to the magnetizing windings 38 and 39 from the control circuitry of FIG. 3 and virtually no power will be required to maintain object 1 in its normally stable condition. Further it is noted that, by virtue of the construction of the magnetic force applier of FIGS. 2A and 2B, most of the magnetomotive force drop will occur in the gap between pole piece 43 and the end of object 1 because the return gap between object 1 and the cylindrical portion 35 is of relatively wide area and of low reluctance so that little radial force is applied through that gap to object 1. As a result, substantial force is produced at the gap between pole piece 43 and the end of object 1, relatively close to the axis of object 1, which tends to minimize any twisting or cocking tendency of object 1.

While as herein shown and described, a magnetic force applier for use in practicing the invention comprises a magnetic loop having a single pair of arms each including a section of permanent magnet material and having a magnetizing winding associated therewith, it will be understood that other configurations may be used to yield similar results. Thus configurations having more than two arms may be used, sections of permanent magnet material of the invariant type being included in some of the arms and sections of permanent magnet material of the type having a hysteresis characteristic being included in other arms. In such a multiple-arm configuration, magnetizing windings may be provided associated with only some or with all of the separate arms.

Further, while the invention has been described herein with reference to an arrangement employing two force-applying means symmetrically disposed at opposite ends of the object to be supported, it will be understood that the force appliers need not be positioned at the extremities of the supported object but instead may be placed at any desired position along the length of the object and may be arranged to exert forces generally along the axis thereof. Similarly, two force appliers need not be used, but instead a single force applier may be used located at any convenient position along the axis of the supported object.

Although it is not intended hereby to limit the scope of the invention, the following is a list of typical values and types of components which may be utilized in the circuitry of FIG. 3:

Amplifier 50; Type 741
Hall-effect sensor 13; Amer. Aerospace Controls, Inc. Type HI-1
Resistor 55; 1,000 ohms
Resistor 56; 1,000 ohms
Resistor 57; 1,000 ohms
Resistor 58; 29,000 ohms
Amplifier 59; Type 741
Amplifier 60; Type 741
Resistor 61; 1 megohm
Capacitor 62; 0.047 microfarad
Resistor 63; 470,000 ohms
Capacitor 64; 0.1 microfarad
Capacitor 65; 0.01 microfarad
Resistor 66; 270,000 ohms
Resistor 70; 2.2 megohms
Amplifier 71; Type 741
Transistor 72; Sylvania ECG - 159 PNP
Resistor 73; 220 ohms
Diode 74; 1 Amp. Silicon
Diode 75; 1 Amp. Silicon
Transistor 76; 2 N 6358
Transistor 77; 2 N 6358
Resistor 81; 1 megohm
Inverter 82; 741 C
Resistor 83; 2.2 megohms
Amplifier 84; 741 C
Transistor 85; Sylvania ECG - 159 PNP
Resistor 86; 220 ohms
Diode 87; 1 Amp. Silicon
Diode 88; 1 Amp. Silicon
Transistor 29; 2 N 6358
Transistor 90; 2 N 6358
Amplifier 100; 741 C
Resistor 103; 22,000 ohms
Resistor 104; 22,000 ohms
Potentiometer 105; 1 megohm
JFET 106; 2 N 4220
Diode 107; 5 to 30 Ma. Silicon, Type 1N914 or 1N87
Potentiometer 108; 0.5 megohm
Diode 109; 5 to 30 Ma. Silicon, Type 1N914 or 1N87
Amplifier 110; 741 C
Resistor 111; 0.1 megohm
Resistor 112; 0.1 megohm
Diode 113; 5 to 30 Ma. Silicon, Type 1N914 or 1N87
Diode 114; 5 to 30 Ma. Silicon, Type 1N914 or 1N87
Amplifier 115; L M 301
Amplifier 116; L M 301
Zener Diode 117; Z1004
Zener Diode 118; Z1004
Resistor 119; 1,000 ohms
Resistor 122; 1,000 ohms
Diode 120; 1 Amp. Silicon
Diode 121; 1 Amp. Silicon
Diode 123; 1 Amp. Silicon
Diode 124; 1 Amp. Silicon
Capacitor 126; 0.005 microfarad
Resistor 127; 0.47 microfarad
Capacitor 129; 0.005 microfarad
Resistor 130; 0.47 megohm While the invention has been described with reference to a single preferred embodiment, it will be understood that it may be embodied in many other forms in accordance with the principles herein set forth and within the scope of the invention defined by the following claims.

I claim:

1. Magnetic suspension apparatus comprising:
   (a) a movable object having a longitudinal axis,
   (b) at least one magnetic force applying means associated with said object, said means comprising a closed loop of magnetically permeable material including as a part thereof a substantially cylindrical portion encircling said object and having a pole piece positioned to form a gap between said pole piece and said object and arranged to exert force on said object generally along the longitudinal axis thereof, the magnitude of said force depending on the magnitude of the magnetic flux across said gap,
   (c) first and second sections of permanently magnetizable material included in said magnetic loop in separate arms thereof,
   (d) first and second magnetizing windings respectively encircling said separate arms of said magnetic loop,
   (e) means associated with said object for developing servo signals in response to at least the rate of change of displacement of said object along its longitudinal axis,
   (f) means for applying said servo signals to said first and second windings to produce fluxes in said magnetic loop such as to produce additive fluxes across said gap for restoring said object to a reference position along its longitudinal axis,
   (g) means for producing an integrated signal varying according to the time integral of said servo signals,
   (h) and means for applying to said first and second windings high-intensity current pulses controlled in accordance with said integrated signal to alter the permanent magnetization of one of said sections of permanently magnetizable material.

2. Apparatus according to claim 1 in which said first and second sections of permanently magnetizable material have different hysteresis characteristics.

3. Apparatus according to claim 2 in which one of said sections of permanently magnetizable material has an invariant characteristic, and in which the other of said sections has a hysteresis characteristic.

4. Apparatus according to claim 2 in which one of said sections of permanently magnetizable material comprises Alnico V and the other section comprises samarium cobalt.

5. Apparatus according to claim 1 in which said means for applying said servo signals to said first and second windings is constructed and arranged to apply said signals in a manner to increase the net magnetic flux across said gap when said gap is increasing, and in a manner to reduce the net magnetic flux across said gap when said gap is decreasing.

6. Apparatus according to claim 1 in which said means for applying said high-intensity pulses to said first and second windings is constructed and arranged to apply said pulses in a manner to increase the net magnetic flux across said gap produced by said two permanent magnet sections when said servo signals are operating predominantly to oppose a widening of said gap, and in a manner to decrease the net magnetic flux across said gap produced by said two permanent magnet sections when said servo signals are operating predominantly to oppose a narrowing of said gap.

7. Apparatus according to claim 6 in which said current pulses are applied to said windings in such a manner as to produce fluxes which are additive in said magnetic loop, but which tend to cancel in the path across said gap.

8. Apparatus according to claim 1 comprising a pair of said force applying means symmetrically disposed with respect to said object on opposite sides of the central portion thereof.

9. Apparatus according to claim 8 in which said object includes a section of non-magnetic material centrally disposed therein for minimizing interaction between said force applying means.

10. Magnetic suspension apparatus comprising:
(a) a movable object having a longitudinal axis,
(b) first and second magnetic force applying means symmetrically disposed with respect to said object on opposite sides of the central portion thereof, each of said means comprising a closed loop of magnetically permeable material including as a part thereof a substantially cylindrical portion encircling said object and having a pole piece positioned to form a gap between said pole piece and said object and arranged to exert force on said object generally along the longitudinal axis thereof, the magnitude of said force depending upon the magnitude of the magnetic flux across said gap,
(c) first and second magnetizing windings respectively encircling separate arms of each of said magnetic loops,
(d) first and second sections of permanently magnetizable material included in at least one of said magnetic loops in separate arms thereof,
(e) means associated with said object for developing servo signals in response to at least the rate of change of displacement of said object along its longitudinal axis,
(f) means for applying said servo signals to at least said first and second windings associated with one of said magnetic loops to produce fluxes therein such as to produce additive fluxes across said gap for restoring said object to a reference position along its longitudinal axis,
(g) means for producing an integrated signal varying according to the time integral of said servo signals.
(h) and means for applying to said first and second windings associated with said one magnetic loop high-intensity current pulses controlled in accordance with said integrated signal to alter the permanent magnetization of one of said sections of permanently magnetizable material.

11. Apparatus according to claim 1 in which said means for developing servo signals is responsive to both displacement and rate of displacement of said object along its longitudinal axis.

12. Apparatus according to claim 11 in which said signal developing means comprises means associated with said movable object for developing signals representative of displacement of said object along its longitudinal axis and means responsive to said last-named signals for developing signals representative of both said displacement and the rate thereof.

13. Apparatus according to claim 12 in which said means for developing signals representative of both displacement and rate thereof include an amplifier supplied with said signals representative of displacement and having a negative feedback path from its output to its input including means for partially integrating the output from said amplifier.

14. Apparatus according to claim 1 in which said servo signal developing means comprises magnetic means associated with said movable object.

15. Apparatus according to claim 14 in which said magnetic means comprises a Hall-effect sensor cooperating with a permanent magnet affixed to said movable object.

16. Apparatus according to claim 15 including an operational amplifier, means connecting the output of said amplifier to the reference current terminal of said Hall-effect sensor, and means for supplying the output of said sensor to the input of said amplifier in a sense to cause said sensor to operate as a multiplier.

17. A magnetic force applier for use in a magnetic suspension system comprising:
(a) a closed loop of magnetically permeable material including a cylindrical portion having an aperture adapted to encircle an object to be supported and having a pole piece extending from said loop toward said aperture so as to be in juxtaposition to an object inserted through said aperture, said loop including first and second sections of permanently magnetizable material respectively included in separate arms of said magnetic loop between said pole piece and said cylindrical portion,
(b) and first and second magnetizing windings respectively encircling said separate arms, said windings being adapted to be energized by electrical signals applied thereto either in a manner to produce fluxes in said magnetic loop such as to produce additive fluxes through said pole piece and said movable object so as to exert force on said object, or in a manner to produce fluxes in said loop which flow primarily in said loop so as to tend to alter the magnetization of said sections of permanently magnetizable material, and which oppose each other in the gap between said pole piece and said object so as to exert no substantial force on said object.

18. A magnetic force applier according to claim 17 in which said first and second sections of permanently magnetizable material have different hysteresis characteristics.

19. A magnetic force applier according to claim 17 in which one of said sections of permanently magnetizable material comprises a material of invariant characteristic and in which the other of said sections of permanently magnetizable material comprises material having a hysteresis characteristic.

20. A magnetic force applier according to claim 17 in which one of said sections of permanently magnetizable material comprises Alnico V and in which the other of said sections of permanently magnetizable material comprises samarium cobalt.

21. A magnetic force applier according to claim 17 in which said pole piece extension includes a section comprising a permanent magnet.

22. A magnetic force applier according to claim 17 including a probe extending from said pole piece in the direction of said aperture said probe being provided with a magnetic sensor adapted to cooperate with a permanent magnet in a supported object to develop signals indicative of the displacement of said object with reference to said force applier.

23. Apparatus according to claim 22 in which said magnetic sensor comprises a Hall-effect sensor.

* * * * *

UNITED STATES PATENT AND TRADEMARK OFFICE
CERTIFICATE OF CORRECTION

PATENT NO. : 4,088,379
DATED : May 9, 1978
INVENTOR(S) : Lloyd J. Perper

It is certified that error appears in the above-identified patent and that said Letters Patent are hereby corrected as shown below:

Column 1, line 29 change "in" first occurrence to --it--.

Column 5, line 64, add -- 3.-- after "applier".

Column 7, line 29, change "Halleffect" to -- Hall-effect --.

Column 7, line 45, after "resistor 61" insert -- having capacitor 62 in parallel therewith, which cooperate to provide such feedback --.

Signed and Sealed this

Fifth Day of June 1979

[SEAL]

Attest:

RUTH C. MASON
*Attesting Officer*

DONALD W. BANNER
*Commissioner of Patents and Trademarks*